(12) United States Patent
Bossi

(10) Patent No.: US 11,469,451 B2
(45) Date of Patent: Oct. 11, 2022

(54) BATTERY, A BATTERY SYSTEM AND A METHOD FOR EXCHANGING AT LEAST ONE COMPONENT OF A BATTERY

(71) Applicant: Robert Bosch GmbH, Stuttgart (DE)

(72) Inventor: Davide Bossi, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 516 days.

(21) Appl. No.: 16/463,411

(22) PCT Filed: Nov. 8, 2017

(86) PCT No.: PCT/EP2017/078531
§ 371 (c)(1),
(2) Date: May 23, 2019

(87) PCT Pub. No.: WO2018/095728
PCT Pub. Date: May 31, 2018

(65) Prior Publication Data
US 2020/0136197 A1 Apr. 30, 2020

(30) Foreign Application Priority Data

Nov. 23, 2016 (DE) ..................... 10 2016 223 142.1

(51) Int. Cl.
*H01M 10/42* (2006.01)
*H01M 10/48* (2006.01)
*H02J 7/00* (2006.01)

(52) U.S. Cl.
CPC ..... *H01M 10/4221* (2013.01); *H01M 10/425* (2013.01); *H01M 10/486* (2013.01);
(Continued)

(58) Field of Classification Search
CPC .. H02J 7/0047; H02J 7/00032; H02J 7/00034; H02J 7/00036; H02J 7/00038;
(Continued)

(56) References Cited

U.S. PATENT DOCUMENTS

| | | | |
|---|---|---|---|
| 10,283,982 B2 * | 5/2019 | Namou | H02J 7/0031 |
| 2012/0050054 A1 * | 3/2012 | Fujiwara | H01M 10/425 |
| | | | 340/636.1 |

(Continued)

FOREIGN PATENT DOCUMENTS

| | | |
|---|---|---|
| DE | 102012215208 | 3/2014 |
| DE | 102013209446 | 11/2014 |

(Continued)

OTHER PUBLICATIONS

International Search Report for Application No. PCT/EP2017/078531 dated Jan. 12, 2018 (English Translation, 2 pages).

*Primary Examiner* — Nathaniel R Pelton
(74) *Attorney, Agent, or Firm* — Michael Best & Friedrich LLP

(57) ABSTRACT

The invention relates to a battery (1) comprising the following components: a control means (2), at least one battery cell (4, 5, 6), and at least one additional electrical component, wherein the battery (1) has an interface (18) in order to provide a data-transferring connection to an external maintenance module (12), wherein at least one component has an identification feature and is designed to be exchangeable, wherein technical data can be assigned to the component by means of the identification feature.

20 Claims, 1 Drawing Sheet

(52) U.S. Cl.
CPC ... *H02J 7/0047* (2013.01); *H01M 2010/4271* (2013.01); *H01M 2010/4278* (2013.01)

(58) Field of Classification Search
CPC .............. H02J 7/00041; H02J 7/00043; H02J 7/00045; H01M 10/4221; H01M 10/425; H01M 10/486; H01M 2010/4271; H01M 2010/4278
USPC ......................................................... 320/106
See application file for complete search history.

(56) References Cited

U.S. PATENT DOCUMENTS

| | | |
|---|---|---|
| 2013/0204474 A1 | 8/2013 | Gyenes et al. |
| 2014/0062385 A1* | 3/2014 | Gaebler .................. B60L 58/21 320/106 |
| 2016/0036098 A1 | 2/2016 | Washiro |
| 2016/0171794 A1* | 6/2016 | Brochhaus ........... G01R 31/367 701/31.7 |
| 2017/0077560 A1* | 3/2017 | Kemp ................... H01M 10/48 |

FOREIGN PATENT DOCUMENTS

| | | |
|---|---|---|
| DE | 102015101684 | 9/2015 |
| EP | 2845261 | 3/2015 |

\* cited by examiner

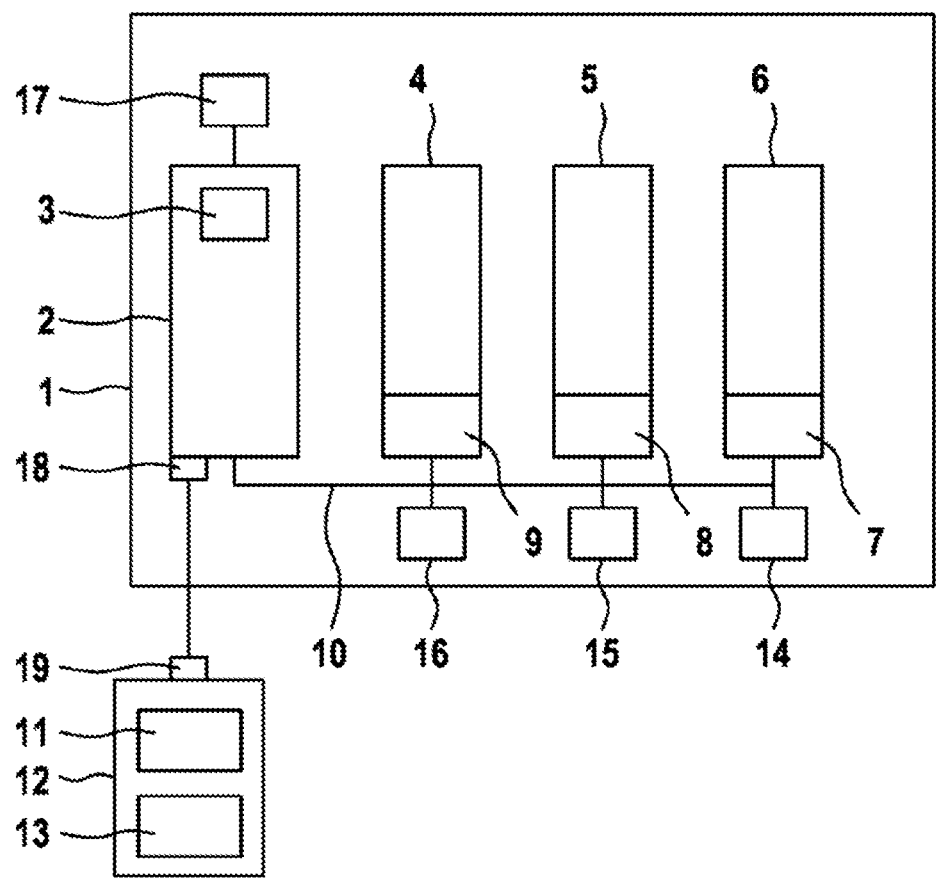

BATTERY, A BATTERY SYSTEM AND A METHOD FOR EXCHANGING AT LEAST ONE COMPONENT OF A BATTERY

BACKGROUND OF THE INVENTION

The present invention relates to a battery, a battery system and a method for interchanging at least one component of a battery.

DE 10 2012 215 208 A1 shows a battery system and a method for detecting unauthorized module interchange on a battery system.

Battery systems are used both in stationary applications, such as wind turbines or solar energy systems, and in motor vehicles, such as hybrid vehicles or electric vehicles, or in electronic devices, such as laptops or mobile phones.

SUMMARY OF THE INVENTION

The invention for the battery is based on a battery, having the following as components: a control means, at least one battery cell and at least one further electrical component.

The essence of the invention is that the battery has an interface for data-carrying connection to an external maintenance module, wherein at least one component has an identification feature and is embodied interchangeably, wherein technical data are associable with the component by means of the identification feature.

Advantageously, the respective component is therefore uniquely identifiable. A new component for interchange with a component that needs to be interchanged likewise has an identification feature. The identification features of the component that needs to be interchanged and the new component are comparable, in particular by means of the external maintenance module. Therefore, a new component matching the component that needs to be interchanged is selectable by means of the identification features.

For the purpose of identifying the respective component, the identification feature is readable by means of the external maintenance module.

Therefore, a faulty component of the battery is interchangeable in a simple manner. The other components of the battery continue to be usable in this case.

Further advantageous embodiments of the present invention are the subject matter of the subclaims.

According to one advantageous embodiment, the control means has a memory unit, wherein the identification feature and/or the technical data and/or operating parameters and/or a fault status of the respective component are storable by means of the memory unit. Advantageously, the memory unit is embodied as a nonvolatile memory. It is advantageous in this case that the data required for storing the components of the battery are available in the control means.

Further, it is advantageous if the memory unit stores the technical data associated with the respective identification feature, wherein the control means is configured to associate the accompanying technical data with the respective component. Therefore, the respective technical data of the respective component are uniquely associable by means of the identification feature. Advantageously, the identification features of the components of the battery and of the components usable in the battery and the accompanying technical data are stored in the memory unit.

Preferably, the identification feature is embodied as an identification number or graphical code or RFID transponder. It is advantageous in this case that the respective identification feature is attachable to the respective component, in particular in adhesive or printed fashion. Therefore, the identification feature is readable in a simple manner, for example by means of a camera or a scanner.

According to a further advantageous embodiment, the further electrical component is embodied as a sensor, wherein the control means is connected to the respective sensor in data-carrying fashion. Therefore, operating parameters of the components of the battery are monitorable by means of a sensor. In this case, the control means is configured to evaluate a signal of the respective sensor.

Preferably, the respective sensor is embodied as a temperature sensor or current sensor or voltage sensor or pressure sensor.

Further, it is advantageous if the respective sensor is associated with a respective battery cell, wherein the respective sensor is configured for determining a present operating parameter of the respective battery cell, in particular a temperature or a pressure or a voltage or a charging current and/or a discharge current. As a result, the operating parameters of the respective battery cell are separately monitorable. Advantageously, in the event of a fault, it is therefore necessary to shut down and/or interchange only that battery cell that has a fault.

According to a further advantageous embodiment, the further electrical component is embodied as a precharging circuit, wherein the precharging circuit is connected to the control means in data-carrying fashion, wherein the precharging circuit is configured to limit an inrush current of the battery. As a result, wear on the battery is reducible, since high inrush currents are prevented.

According to a further advantageous embodiment, the further electrical component is embodied as a monitoring unit, wherein each battery cell has a respective associated monitoring unit, wherein the respective monitoring unit is connected to the control means in data-carrying fashion, in particular wherein the respective monitoring unit is configured for evaluating a signal of a sensor associated with the respective battery cell. It is advantageous in this case that the monitoring units are arrangeable locally to the respective battery cell. The control means is relieved of load by means of the monitoring units.

Advantageously, the battery has a combination of different further electrical components, wherein at least one component is embodied interchangeably. Therefore, reuse of the battery after failure of a single component is simplified by virtue of only this defective component being interchanged.

The invention for the battery system is based on a battery system, having a battery, in particular a battery as described above or as claimed in at least one of the claims relating to the battery.

The essence of the invention is that the battery system has a maintenance module, wherein the maintenance module has an interface for data-carrying connection to the battery, wherein the maintenance module has a capture means configured to capture an identification feature of a component of the battery that needs to be interchanged or of a new component of the battery.

It is advantageous in this case that the maintenance module and the battery are two separate units. The maintenance module and the battery are connectable in data-carrying fashion by means of the interfaces in order to send data from the battery to the maintenance module or to send data from the maintenance module to the battery. Therefore, the maintenance module is usable for a multiplicity of batteries.

Preferably, the capture means is embodied as a camera or a scanner or a radio receiver. Therefore, the identification feature is capturable in a simple manner.

Further, it is advantageous if the maintenance module has a memory means, wherein the identification feature and/or technical data and/or operating parameters and/or a fault status of the respective component are storable by means of the memory means. Advantageously, the memory means stores data from a multiplicity of components for different battery types. The interchange of a component results in only the data relevant to the respective component being sent to the battery. The maintenance module is thus usable for a multiplicity of different battery types.

Preferably, the memory means stores the technical data associated with the respective identification feature, wherein the maintenance module is configured to associate the accompanying technical data with the respective component. Therefore, the technical data of the respective component are sendable to the battery or to the control means of the battery.

Further, it is advantageous if the maintenance module is configured to send an identification feature and/or technical data and/or operating parameters and/or a fault status of the respective component to a control means of the battery by means of the interface. Therefore, the identification feature and/or the technical data and/or the operating parameters and/or the fault status are usable for controlling the respective component.

The essence of the invention for the method for interchanging at least one component of a battery, in particular a battery as described above or as claimed in one of the claims relating to the battery, is that a first method step involves a control means of the battery sending an identification feature and/or technical data and/or operating parameters and/or a fault status of a component of the battery that needs to be interchanged to an external maintenance module, that a second method step involves the component that needs to be interchanged being separated from the battery, that a third method step involves an identification feature of a new component being read in by the maintenance module, that a fourth method step involves the new component being connected to the battery, that a fifth method step involves the identification feature and/or the technical data of the new component of the battery being sent from the maintenance module to the control means, wherein the identification feature is evaluated, as a result of which technical data are associated with the new component.

It is advantageous in this case that a component of the battery is interchangeable in a simple manner. Technical data used for controlling the component are uniquely associable with the component by means of the identification feature.

Advantageously, the operating parameters of the respective component are usable for determining a further use of the respective component. By way of example, a battery cell whose maximum capacity has dropped below a minimum value required for mobile applications continues to be usable for stationary applications.

Preferably, a sixth method step involves the control means storing the identification feature and/or the technical data of the new component. Therefore, the maintenance module is separable from the control means, and usable for maintaining further batteries, after the data are sent to the control means.

Further, it is advantageous if the control means uses the technical data for controlling the new component and/or for evaluating signals of the new component. Therefore, control of the new component or evaluation of the signal of the new component is simplified.

According to a further advantageous embodiment, the new component is selected by means of the identification feature and/or the technical data and/or the operating parameters and/or a fault status of the component that needs to be interchanged, wherein the identification feature and/or the technical data of the component that needs to be interchanged and of the new component are compared, in particular wherein the external maintenance module selects the new component. This improves safety, since only suitable components are connected to the battery.

Preferably, present operating parameters of the respective component are determined and are sent to the control means. These operating parameters are usable for determining the further use of the respective component.

Further, it is advantageous if the present operating parameters are evaluated and compared with a respective critical limit value of the technical data, wherein values above or below the critical limit value result in a safety action being triggered. This improves safety.

According to a further advantageous embodiment, interchange of the control means results in a first method step additionally involving identification features and/or technical data and/or operating parameters and/or a respective fault status of all components of the battery being sent to the maintenance module, and the fifth method step additionally involves the identification features and/or the technical data and/or the operating parameters and/or the fault status of all components of the battery being sent to the new control means. Therefore, the new control means has all the required data available from the control means that is to be interchanged. The identification features of the components of the battery do not need to be read in again and evaluated. This allows fast startup of the new control means.

BRIEF DESCRIPTION OF THE DRAWINGS

The section below explains the invention on the basis of exemplary embodiments, from which further inventive features can emerge, but to which the scope of the invention is not restricted. The exemplary embodiments are depicted in the drawing, in which:

FIG. 1 shows a schematic depiction of a battery system according to the invention, having a battery 1 according to the invention and an external maintenance module 12.

DETAILED DESCRIPTION

FIG. 1 shows the battery system according to the invention. The battery 1 has a control means 2, at least one battery cell (4, 5, 6) and at least one further electrical component as components. Furthermore, the battery 1 has an interface 18 for data-carrying connection to the external maintenance module 12.

The external maintenance module 12 has a memory means 11, an interface 19 for data-carrying connection to the interface 18 of the battery 1 and a capture means 13 for reading an identification feature of a component of the battery 1, for example a camera and/or a scanner and/or a radio receiver.

A battery 1 is understood in this case to mean for example a rechargeable battery, in particular an electrochemical battery cell and/or a battery module having at least one electrochemical battery cell and/or a battery pack having at least one battery module. The battery cell is embodiable as a lithium-based battery cell, in particular a lithium-ion battery cell. Alternatively, the battery cell is embodied as a lithium-polymer battery cell or nickel-metal hydride battery cell or lead-acid battery cell or lithium-air battery cell or lithium-sulfur battery cell.

The control means 2 has a memory unit 3. The memory unit 3 is embodied as a nonvolatile memory, preferably as an EEPROM or flash memory.

Each component of the battery 1 has a respective associated identification feature, for example an identification number. Technical data are associable with the respective component by means of the identification feature. By way of example, a maximum capacity, a maximum charging current or discharge current, a maximum voltage, a maximum internal pressure or a maximum temperature is associable with a respective battery cell (4, 5, 6).

Preferably, the identification feature is embodied as a graphical code or RFID transponder arranged on the respective battery cell (4, 5, 6), in particular in printed or adhesive fashion. By way of example, the identification feature is embodied as a barcode or QR code.

A further electrical component is embodied for example as a sensor (14, 15, 16), in particular as a current sensor and/or a voltage sensor and/or a temperature sensor and/or a pressure sensor. A sensor type and a measurement range are associable with a respective sensor (14, 15, 16) by means of its respective identification feature.

Preferably, a respective sensor (14, 15, 16) is associated with a respective battery cell (4, 5, 6). The respective sensor (14, 15, 16) is configured to determine present operating parameters of the respective battery cell (4, 5, 6), in particular the present charging current, the temperature, the internal pressure or the voltage of the respective battery cell (4, 5, 6).

The control means 2 is connected to the sensors (14, 15, 16) in data-carrying fashion. The control means 2 is configured to read the sensors (14, 15, 16) and to evaluate a signal of the respective sensor (14, 15, 16).

The identification feature and/or the operating parameters and/or a fault status of the respective battery cell (4, 5, 6) are storable by means of the memory unit 3. Preferably, the memory unit 3 stores the technical data associated with an identification feature. Alternatively, the technical data associated with an identification feature are stored in the memory means 11 of the external maintenance module 12.

Preferably, the control means 2 has a comparison means configured to compare the operating parameters of the respective component with the technical data of the respective component. Values of the operating parameters above or below a critical value of the technical data result in the control means 2 assigning a fault status to the affected component and/or triggering a safety action. A safety action is for example interchange of the respective component and/or of the battery 1, shutdown of the respective component and/or of the battery 1, fast discharge of a battery cell (4, 5, 6) and/or of the battery 1 and/or the activation of a safety mechanism of the battery 1, in particular an overpressure valve and/or a cooling mechanism.

Furthermore, a further electrical component is embodiable as a precharging circuit 17. An inrush current of the battery 1 is limitable by means of the precharging circuit 17. Preferably, the precharging circuit 17 has a contactor and a resistor. The precharging circuit 17 is connected to the control means 2 and actuatable by means of the control means 2.

Advantageously, a further electrical component is embodied as a monitoring unit (7, 8, 9). In this case, each battery cell (4, 5, 6) has a respective associated monitoring unit (7, 8, 9). Preferably, the respective monitoring unit (7, 8, 9) is connected to at least one sensor (14, 15, 16) associated with the respective battery cell (4, 5, 6) and is configured for evaluating a signal of the respective sensor (14, 15, 16).

The method according to the invention for interchanging at least one component of a battery has the following, in particular chronologically successive, method steps:

The present operating parameters of the component of the battery 1 that needs to be interchanged, in particular a battery cell (4, 5, 6) or a sensor (14, 15, 16) or a monitoring means (7, 8, 9) or a precharging circuit 17, are sent from at least one sensor (14, 15, 16) to the control means 2.

The control means 2 sends the identification feature and/or the technical data and/or the operating parameters and/or the fault status of the component of the battery 1 that needs to be interchanged to the external maintenance module 12.

The external maintenance module 12 uses the identification feature and/or the technical data and/or the operating parameters and/or the fault status of the component that needs to be interchanged to select a new component.

The component of the battery 1 that needs to be interchanged is separated from the battery.

The maintenance module 12 reads in the identification feature of the new component of the battery 1, for example by means of a scanner that reads in a barcode or a QR code or an RFID transponder on the new component.

The new component is connected to the battery 1.

The maintenance module 12 transmits the identification feature and/or the technical data of the new component of the battery 1 to the control means 2.

The control means 2 stores the identification feature and/or the technical data of the new component.

The control means 2 evaluates the identification feature and associates technical data with the new component. Alternatively, the maintenance module 12 evaluates the identification feature and associates technical data with the new component.

The control means 2 uses the technical data for controlling the new component and/or for evaluating the signals of the new component.

Interchange of the control means 2 is prompted by, in addition to the identification feature and/or the technical data of the control means 2, all the data stored in the memory unit 3 of the control means 2 being sent to the maintenance module 12 and later sent from the maintenance module 12 to the new control means 2. Thus, the identification features and/or the technical data and/or the operating parameters and/or the fault status of all the components of the battery 1 are sent from the control means 2 to the maintenance module 12.

The invention claimed is:

1. A battery (1) comprising:
   a control means (2),
   at least one battery cell (4, 5, 6),
   a sensor embodied interchangeably within the at least one battery cell,
   wherein the sensor is one selected from the group consisting of a current sensor, a voltage sensor, and a pressure sensor,
   wherein the battery (1) has an interface (18) for data-carrying connection to an external maintenance module (12), wherein the sensor of the battery has an identification feature and is embodied interchangeably within the at least one battery cell, wherein technical data are associable with the sensor via the identification feature, and the battery is configured to:

send, via the control means (2), the identification feature, technical data, operating parameters, a fault status of the sensor of the battery (1) that needs to be interchanged, or combination of the same to the external maintenance module (12), the sensor that needs to be interchanged is separated from the battery (1), read, via the maintenance module (12), the identification feature of a new sensor, the new sensor is connected to the battery (1), send the identification feature, the technical data of the new sensor of the battery (1), or both from the external maintenance module (12) to the control means (2), wherein the identification feature is evaluated, as a result of which technical data are associated with the new sensor.

2. The battery (1) as claimed in claim 1, wherein the control means (2) has a memory unit (3), and wherein the identification feature, the technical data, operating parameters, a fault status of the sensor, or a combination of the same are storable via the memory unit (3).

3. The battery (1) as claimed in claim 2, wherein the memory unit (3) stores the technical data associated with the identification feature, and wherein the control means (2) is configured to associate the accompanying technical data with the sensor.

4. The battery (1) as claimed in claim 1, wherein the identification feature is embodied as an identification number or graphical code or RFID transponder.

5. The battery (1) as claimed in claim 1, wherein the control means (2) is connected to the sensor (14, 15, 16) in data-carrying fashion.

6. The battery (1) as claimed in claim 1, wherein the sensor (14, 15, 16) is associated with a battery cell (4, 5, 6), wherein the sensor (14, 15, 16) is configured for determining a present operating parameter of the battery cell (4, 5, 6).

7. The battery (1) as claimed in claim 1, wherein the sensor includes a precharging circuit (17), wherein the precharging circuit (17) is connected to the control means (2) in data-carrying fashion, and wherein the precharging circuit is configured to limit an inrush current of the battery (1).

8. The battery (1) as claimed in claim 1, wherein the sensor includes a monitoring unit (7, 8, 9), wherein each battery cell (4, 5, 6) has a respective associated monitoring unit (7, 8, 9), and wherein the respective monitoring unit (7, 8, 9) is connected to the control means (2) in data-carrying fashion.

9. A battery system comprising:

a battery (1) having a control means (2), at least one battery cell (4, 5, 6), a sensor embodied interchangeably within the at least one battery cell, an interface (18) configured to provide a data-carrying connection, wherein the sensor is one selected from the group consisting of a current sensor, a voltage sensor, and a pressure sensor, wherein the sensor of the battery has an identification feature and is embodied interchangeably within the at least one battery cell, wherein technical data are associable with the sensor via the identification feature, a maintenance module (12) connected to the interface 18, wherein the maintenance module (12) has an interface (19) for data-carrying connection to the battery (1), wherein the maintenance module (12) has a capture means (13) configured to capture an identification feature of the sensor of the battery (1) that needs to be interchanged and of a new sensor of the battery (1), and the battery system is configured to:

send, via the control means (2), the identification feature, technical data, operating parameters, a fault status of the sensor of the battery (1) that needs to be interchanged, or combination of the same to an external maintenance module (12), the sensor that needs to be interchanged is separated from the battery (1), read, via the maintenance module (12), an identification feature of a new sensor, the new sensor is connected to the battery (1), send the identification feature, the technical data of the new sensor of the battery (1), or both from the external maintenance module (12) to the control means (2), wherein the identification feature is evaluated, as a result of which technical data are associated with the new sensor.

10. The battery system as claimed in claim 9, wherein the capture means (13) is embodied as a camera or a scanner or a radio receiver.

11. The battery system as claimed in claim 9, wherein the maintenance module (12) has a memory means (11), wherein the identification feature, technical data, operating parameters, a fault status of the sensor, or a combination of the same are storable via the memory means (11).

12. The battery system as claimed in claim 11, wherein the memory means (11) stores the technical data associated with the identification feature, wherein the maintenance module (12) is configured to associate the accompanying technical data with the sensor.

13. The battery system as claimed in claim 9, wherein the external maintenance module (12) is configured to send an identification feature, technical data, operating parameters, a fault status of the sensor, or a combination of the same to a control means (2) of the battery (1) by means of the interface (19).

14. A method for interchanging the sensor of a battery (1) that includes a control means (2), at least one battery cell (4, 5, 6), and a sensor, wherein the sensor is one selected from the group consisting of a current sensor, a voltage sensor, and a pressure sensor, wherein the battery (1) has an interface (18) for data-carrying connection to an external maintenance module (12), wherein the sensor of the battery has an identification feature and is embodied interchangeably within the battery, wherein technical data are associable with the sensor via the identification feature, and
wherein the method includes:
sending, via the control means (2) of the battery (1), an identification feature, technical data, operating parameters, a fault status of the sensor of the battery (1) that needs to be interchanged, or combination of the same to an external maintenance module (12),
separating the sensor that needs to be interchanged from the battery (1),
reading, via the maintenance module (12), an identification feature of a new sensor,
connecting the new sensor to the battery (1),
sending the identification feature, the technical data of the new sensor of the battery (1), or both from the external maintenance module (12) to the control means (2),
wherein the identification feature is evaluated, as a result of which technical data are associated with the new sensor.

15. The method as claimed in claim 14,
further comprising storing, via the control means (2) the identification feature, the technical data of the new sensor, or both.

16. The method as claimed in claim 14,
wherein the control means (2) uses the technical data for controlling the new sensor and/or for evaluating signals of the new sensor.

17. The method as claimed in claim 14,
wherein the new sensor is selected by means of the identification feature, the technical data, the operating parameters, a fault status of the sensor that needs to be interchanged, or a combination of the same, and
wherein the identification feature or the technical data of the sensor that needs to be interchanged and of the new sensor are compared.

18. The method as claimed in claim 14,
wherein present operating parameters of the sensor are determined and are sent to the control means (2).

19. The method as claimed in claim 14,
wherein the present operating parameters are evaluated and compared with a critical limit value of the technical data, wherein values above or below the critical limit value result in a safety action being triggered.

20. The method as claimed in claim 14,
further comprising in response to an interchange of the control means (2), sending identification features, technical data, operating parameters, a fault status of all sensors of the battery (1), or a combination of the same to the maintenance module (12), and
sending the identification features, the technical data, the operating parameters, the fault status of all sensors of the battery (1), or a combination of the same to the new control means (2).

* * * * *